United States Patent
Tashiro et al.

(10) Patent No.: US 12,288,680 B2
(45) Date of Patent: Apr. 29, 2025

(54) SPECIMEN CARRIER AND METHOD FOR MANUFACTURING SPECIMEN CARRIER

(71) Applicant: HAMAMATSU PHOTONICS K.K., Hamamatsu (JP)

(72) Inventors: Akira Tashiro, Hamamatsu (JP); Masahiro Kotani, Hamamatsu (JP); Takayuki Ohmura, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 288 days.

(21) Appl. No.: 17/795,964

(22) PCT Filed: Dec. 1, 2020

(86) PCT No.: PCT/JP2020/044710
§ 371 (c)(1),
(2) Date: Jul. 28, 2022

(87) PCT Pub. No.: WO2021/157169
PCT Pub. Date: Aug. 12, 2021

(65) Prior Publication Data
US 2023/0095349 A1 Mar. 30, 2023

(30) Foreign Application Priority Data
Feb. 4, 2020 (JP) .................. 2020-017108

(51) Int. Cl.
*H01J 49/04* (2006.01)
(52) U.S. Cl.
CPC .................. *H01J 49/0418* (2013.01)
(58) Field of Classification Search
CPC ................. H01J 49/0418; G01N 27/623
See application file for complete search history.

(56) References Cited

U.S. PATENT DOCUMENTS

| | | |
|---|---|---|
| 2003/0141591 A1 | 7/2003 | Hsu et al. |
| 2015/0087550 A1 | 3/2015 | O'Keefe et al. |
| 2017/0358436 A1 | 12/2017 | Naito et al. |

FOREIGN PATENT DOCUMENTS

| | | |
|---|---|---|
| CN | 1591876 A | 3/2005 |
| EP | 3214437 A1 | 9/2017 |

(Continued)

OTHER PUBLICATIONS

International Preliminary Report on Patentability mailed Aug. 18, 2022 for PCT/JP2020/044710.

(Continued)

*Primary Examiner* — David E Smith
*Assistant Examiner* — Christopher J Gassen
(74) *Attorney, Agent, or Firm* — Faegre Drinker Biddle & Reath LLP

(57) ABSTRACT

A sample support body includes: an insulating substrate having a measurement region formed with a plurality of through holes; a frame formed with an opening part opening to a first face and a second face to correspond to the measurement region, and formed on the first surface such that the opening part overlaps the measurement region when viewed from a thickness direction of the substrate; an adhesive layer to bond the substrate and the frame and having a protruding portion protruding from an inner surface of the opening part toward the measurement region; and a conductive layer having a first portion provided along the inner surface of the opening part, a second portion provided along the first surface of the measurement region, and a third portion provided along a surface of the protruding portion so as to connect the first portion and the second portion.

15 Claims, 10 Drawing Sheets

(56) References Cited

FOREIGN PATENT DOCUMENTS

| JP | 2002-257845 A | 9/2002 |
| JP | 6093492 B1 | 3/2017 |
| WO | WO-2010/095677 A1 | 8/2010 |
| WO | WO-2014/108323 A1 | 7/2014 |
| WO | WO-2017/038710 A1 | 3/2017 |
| WO | WO-2019/058857 A1 | 3/2019 |
| WO | WO-2019/155802 A1 | 8/2019 |
| WO | WO-2019/155836 A1 | 8/2019 |

OTHER PUBLICATIONS

"Basic Craft of Wireless Electric Welding", Fujian Science and Technology Publishing House, Dec. 1982. p. 282-p. 284, (8 pages).

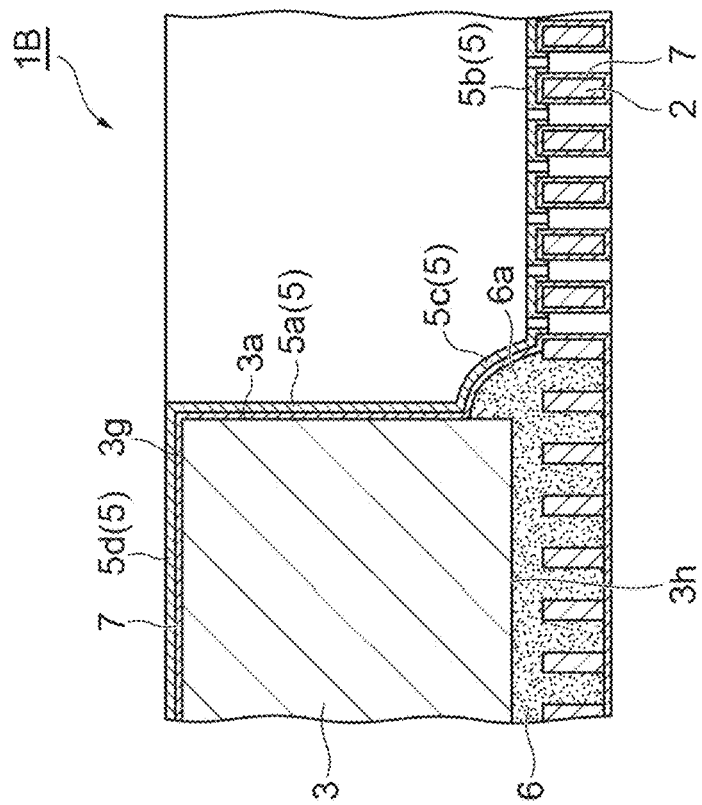
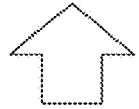
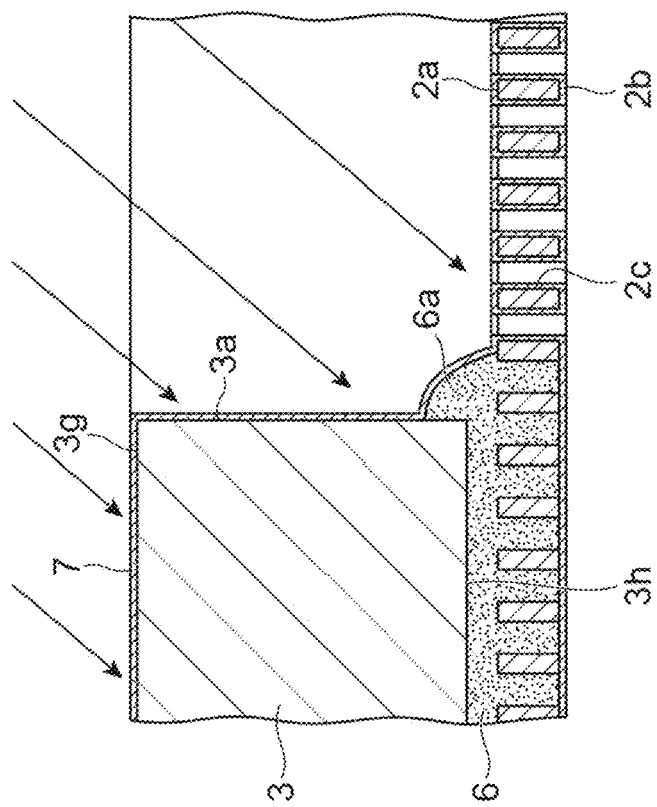
Fig.9

SPECIMEN CARRIER AND METHOD FOR MANUFACTURING SPECIMEN CARRIER

TECHNICAL FIELD

The present disclosure relates to a sample support body and method of manufacturing a sample support body.

BACKGROUND ART

A laser desorption ionization method ionization method is known as a technique for ionizing a sample such as a biological sample in order to perform mass spectrometry or the like. Patent Document 1 discloses sample support body used in the laser desorption ionization method. The sample support body disclosed in Patent Document 1 includes a substrate having a measurement region (effective region) formed with a plurality of through holes, a frame formed with an opening part corresponding to the measurement region and formed on a surface of the substrate, and a conductive layer having a first portion along an inner surface of the opening part of the frame and a second portion along the surface of the substrate.

CITATION LIST

Patent Document

[Patent Document 1] Japanese Patent No. 6093492

SUMMARY OF INVENTION

Technical Problem

In the mass spectrometry using the sample support body, a voltage is applied to the conductive layer via a frame or the like in a state where the sample is disposed in the measurement region. Specifically, a voltage is applied to the second portion of the conductive layer via the first portion of the conductive layer. This sets up a potential difference between the surface of the substrate (i.e., the second portion of the conductive layer) and a ground electrode. In this state, the surface of the substrate is irradiated with an energy beam such as laser light. Accordingly, a component of the ionized sample flies toward the ground electrode and is detected by an ion detection unit included in a mass spectrometer (TOF-MS).

If the first portion and the second portion of the conductive layer are divided, a voltage is not appropriately applied from the first portion to the second portion, and the above-described mass analysis cannot be appropriately performed. That is, since there is no potential difference between the surface of the substrate and the ground electrode, the ionized component of the sample may not fly toward the ground electrode. As a result, a component of the ionized sample may not be appropriately detected by the ion detection unit.

Therefore, an object of the present disclosure is to provide a sample support body capable of appropriately applying a voltage to a surface of a measurement region and a method of manufacturing the sample support body.

Solution to Problem

A sample support body according to an aspect of the present disclosure is a sample support body used for ionizing a sample. The sample support body includes: an insulating substrate having a first surface, a second surface opposite to the first surface, and a measurement region formed with a plurality of through holes opening to the first surface and the second surface; a frame having a first face facing the first surface and a second face opposite to the first face, in which an opening part opening to the first face and the second face is formed to correspond to the measurement region, the frame being formed on the first surface such that the opening part overlaps the measurement region when viewed from a thickness direction of the substrate; an adhesive layer formed between the first surface and the first face to bond the substrate and the frame, the adhesive layer having a protruding portion protruding from an inner surface of the opening part toward the measurement region when viewed from the thickness direction; and a conductive layer having a first portion provided along the inner surface of the opening part, a second portion provided along the first surface of the measurement region, and a third portion provided along a surface of the protruding portion so as to connect the first portion and the second portion.

In the sample support body, a frame is formed on a first surface of a substrate, and a measurement region is defined by an opening part of the frame. That is, a portion of the substrate that overlaps the opening part of the frame when viewed from the thickness direction of the substrate functions as the measurement region. The adhesive layer that bonds the substrate and the frame has a protruding portion that protrudes from the inner surface of the opening part toward the measurement region when viewed from the thickness direction. Thus, the conductive layer has not only a first portion along the inner surface of the opening part and a second portion along the first surface of the measurement region but also a third portion along the surface of the protruding portion. If the protruding portion is not formed (for example, if the edge portion on a side where the measurement region is located of the adhesive layer is located outside the opening part when viewed from the thickness direction of the substrate), the conductive layer may not be appropriately formed on the surface of the adhesive layer buried between the frame and the substrate, the first portion and the second portion may be divided, and conduction may not be established between the first portion and the second portion. On the other hand, according to the sample support body, it is possible to reliably achieve conduction of the first portion and the second portion of the conductive layer. That is, the first portion and the second portion may be appropriately connected through the third portion. Thus, for example, by applying a voltage to the frame, a voltage can be applied to the second portion via the first portion and the third portion. Therefore, according to the sample support body, it is possible to appropriately apply a voltage to the surface of the measurement region (that is, the second portion of the conductive layer).

The protruding portion may have a portion formed on the inner surface of the opening part. In this case, since the edge portion of the opening part of the frame on a side where the first surface is located is supported in a hook shape by the protruding portion, the substrate may be stably fixed to the frame.

In a portion of the substrate that overlaps with the adhesive layer when viewed from the thickness direction, a portion of the adhesive layer may be in the through holes. In this case, the substrate can be more stably fixed to the frame.

The frame may be formed of a non-magnetic material. If the frame is formed of a magnetic material, when the component of the sample arranged in the measurement region is ionized by irradiating the measurement region with the energy beam, the frame may affect the trajectory (flight path toward the ground electrode) of the ion. On the other hand, when the frame is formed of a non-magnetic material, it is possible to prevent the above-described influence on the trajectory of the ion.

The adhesive layer may be formed of a photo-curable adhesive. For example, the adhesive layer may be formed of an acrylic adhesive or an epoxy-based adhesive. In this case, no heating is required to cure the adhesive layer. Therefore, it is possible to prevent the occurrence of deflection caused by the heat treatment (deflection caused by a difference in thermal expansion coefficient between the frame and the substrate). In addition, since such heat treatment is not necessary, it is possible to use a frame having a large difference in thermal expansion coefficient from the substrate without worrying about the occurrence of the above-described deflection. Therefore, it is possible to improve the degree of freedom in selecting the material of the frame.

The substrate may be formed by anodizing a silicon or a valve metal, and the frame may be formed of an acid-resistant metal. In this case, it is possible to perform a pore-widening treatment in which the substrate is fixed to the frame through the adhesive layer and then the substrate and the frame are immersed in an acidic solution to widen the through holes of the substrate. That is, by using the frame formed of the metal having acid resistance, the frame may be prevented from being corroded by the acidic solution during the pore-widening treatment.

The frame may be formed of a stainless steel. In this case, the frame can be made of an inexpensive material.

The sample support body may further include a metal oxide film configured to cover a surface of the adhesive layer such that the surface of the adhesive layer is not exposed to the outside. In this case, since the adhesive layer is confined inside the metal oxide film, for example, in a case where the conductive layer is formed by vapor deposition or the like, it is possible to prevent generation of gas from the adhesive layer. Accordingly, the gas generated from the adhesive layer during the formation of the conductive layer may be prevented from being mixed with the conductive layer. As a result, when the component of the sample disposed in the measurement region is ionized by irradiating the measurement region with the energy beam, it is possible to prevent the component of the adhesive layer (that is, the component mixed in the conductive layer) from being ionized together with the component of the sample. As a result, it is possible to reduce noise caused by ionization of components of the adhesive layer when performing mass spectrometry using the sample support body.

According to an aspect of the present disclosure, there is provided a method of manufacturing a sample support body including: a first step of preparing an insulating substrate having a first surface, a second surface opposite to the first surface, and a measurement region formed with a plurality of through holes opening to the first surface and the second surface; a second step of preparing a frame having a first face and a second face opposite to the first face, in which an opening part opening to the first face and the second face is formed to correspond to the measurement region; a third step of applying an adhesive to an edge portion of the opening part on the first face; a fourth step of arranging the substrate such that the substrate overlaps the first face to which the adhesive is applied and the opening part in a state in which the first face is located above the second face, and such that the first surface faces the first face, to bond the substrate and the frame via the adhesive and form a protruding portion by a part of the adhesive, the protruding portion protruding from an inner surface of the opening part toward the measurement region when viewed from a thickness direction of the substrate; and a fifth step of forming, by vapor deposition or sputtering of metal, a conductive layer having a first portion provided along the inner surface of the opening part, a second portion provided along the first surface of the measurement region, and a third portion provided along a surface of the protruding portion so as to connect the first portion and the second portion.

In the above-described manufacturing method, in the fourth step, the substrate is disposed on the first face of the frame from above in a state where the first face of the frame is located above the second face, whereby the adhesive applied to the edge portion of the opening part in the first face is stretched, and as a result, the protruding portion is formed. In addition, after the substrate and the frame are adhered to each other through the adhesive layer formed of the adhesive, the conductive layer is formed by vapor deposition or sputtering of metal, thereby forming the conductive layer in which the first portion and the second portion are appropriately connected to each other through the third portion along the surface of the protruding portion. As described above, according to the above-described manufacturing method, it is possible to suitably obtain the sample support body exhibiting the above-described effects.

The fourth step may include forming the protruding portion having a portion formed on the inner surface of the opening part. In this case, it is possible to obtain sample support body in which the substrate is stably fixed to the frame.

The method may further include a step of forming a metal oxide film between the fourth step and the fifth step to cover a surface of the adhesive such that the surface of the adhesive is not exposed to the outside. In this case, in the fifth step, the generation of gas from the adhesive may be prevented, and the gas generated from the adhesive may be prevented from being mixed with the conductive layer. As a result, it is possible to prevent a component of the adhesive layer (that is, a component mixed into the conductive layer) from being ionized together with a component of the sample when performing mass spectrometry using the sample support body obtained by the above-described manufacturing method (that is, when a component of the sample disposed in the measurement region is ionized by irradiating the measurement region with an energy beam). As a result, it is possible to reduce noise caused by ionization of components of the adhesive layer.

The metal oxide film may be formed by an atomic layer deposition method. In this case, the metal oxide film can be reliably formed on an entire portion exposed to the outside of the adhesive.

The manufacturing method may further include a step of performing a pore-widening treatment for widening the plurality of through holes by immersing the substrate and the frame in an acidic solution between the fourth step and the fifth step, and the frame may be formed of an acid resistant metal. In this case, it is possible to prevent the frame from being corroded by the acidic solution during the pore-widening treatment.

The adhesive may be a photo-curable adhesive, and the fourth step may include bonding the substrate and the frame by irradiating the adhesive with light. In this case, since it is not necessary to heat the adhesive in order to cure the adhesive, it is possible to prevent the occurrence of deflection (bending) due to heat treatment (deflection due to the difference in thermal expansion coefficient between the frame and the substrate). In addition, since such heat treatment is not necessary, it is possible to use a frame having a large difference in thermal expansion coefficient from the substrate without worrying about the occurrence of the above-described deflection. Therefore, it is possible to improve the degree of freedom in selecting the material of the frame.

Advantageous Effects of Invention

According to the present disclosure, it is possible to provide a sample support body capable of appropriately applying a voltage to a surface of a measurement region, and a method of manufacturing the sample support body.

Figure 1:
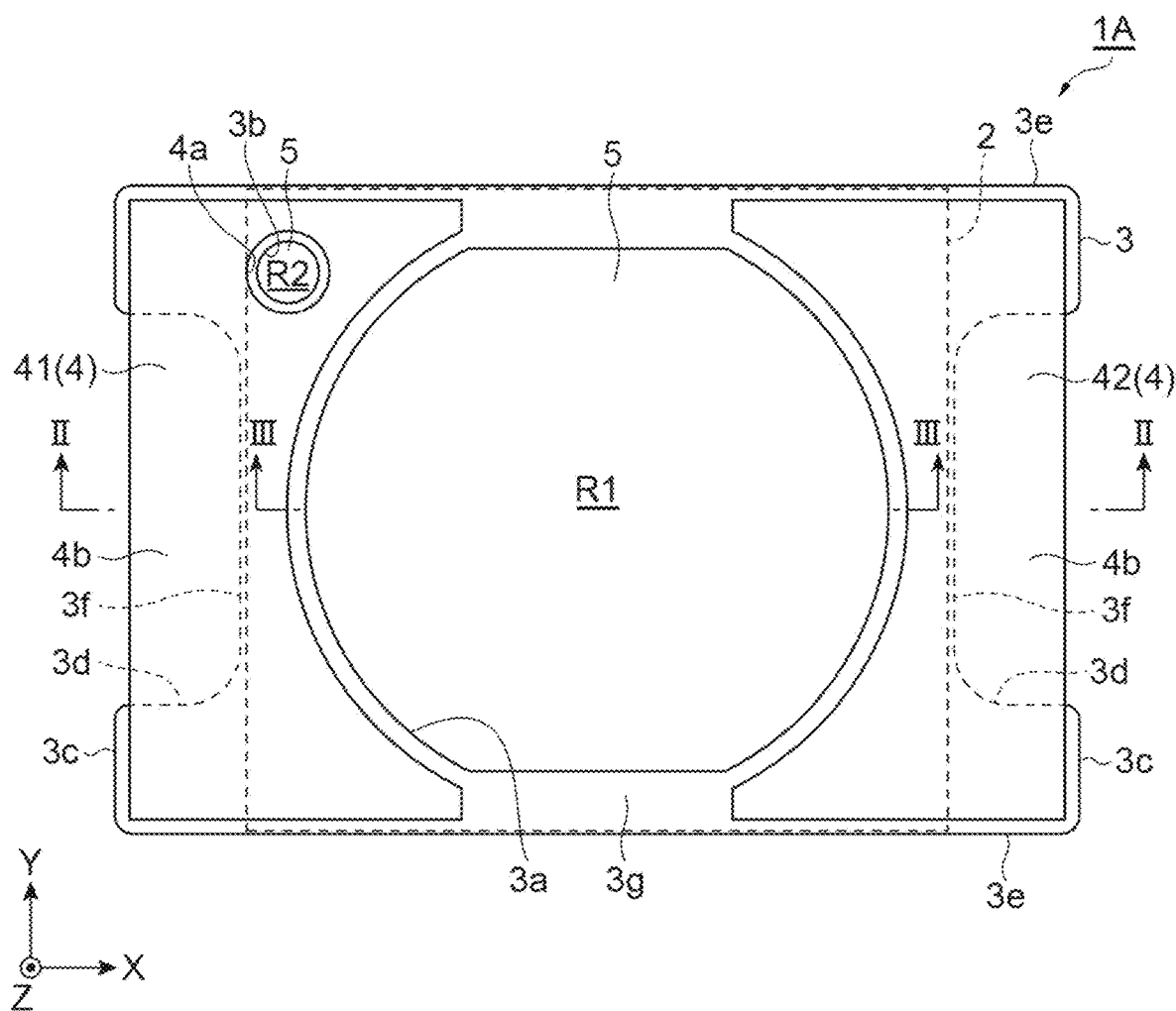
FIG. 1 is a plan view of a sample support body of a first embodiment.
Figure 7:
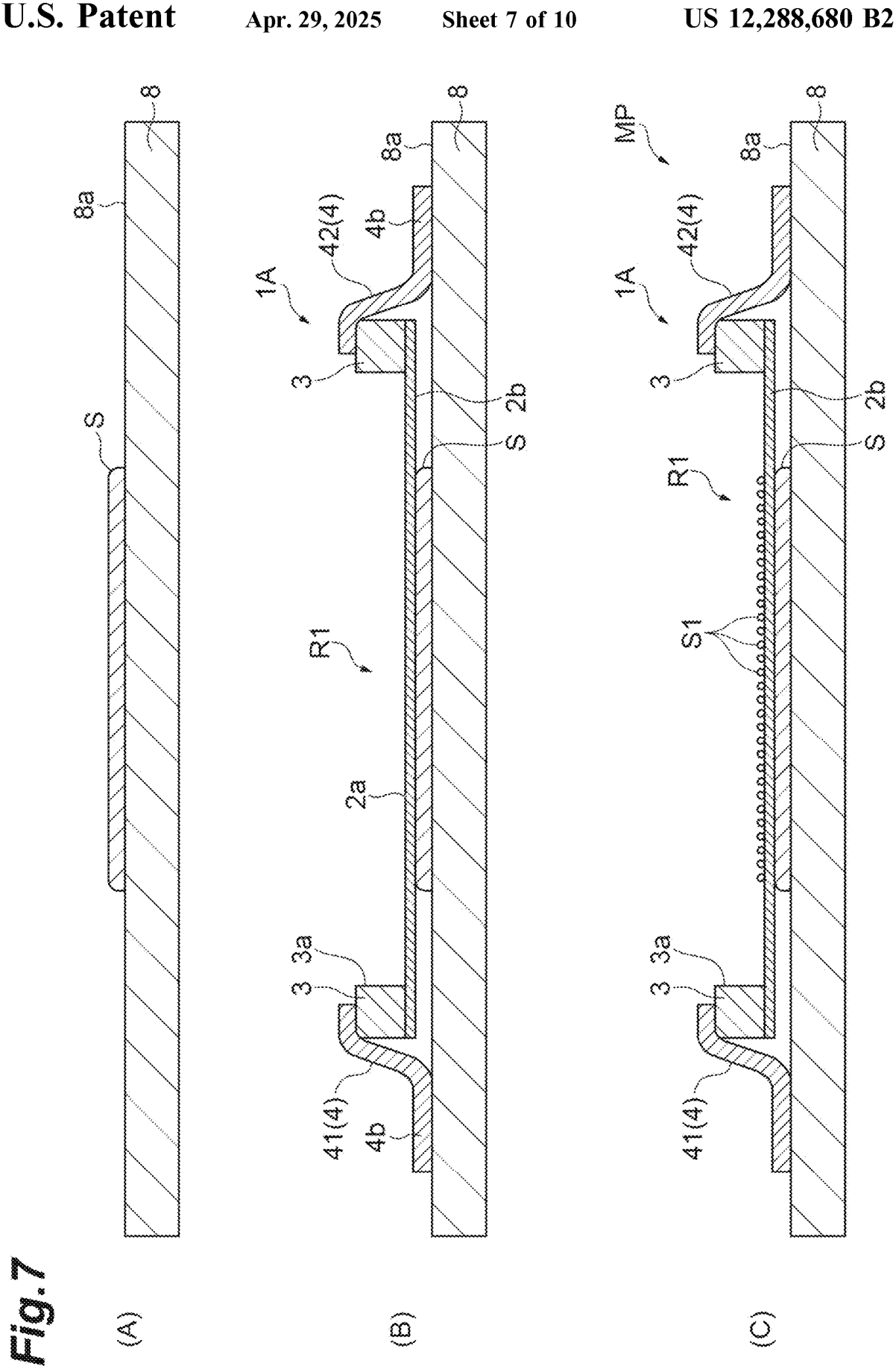

(A), (B), and (C) of FIG. 7 are diagrams showing steps of a mass spectrometry method using the sample support body shown in FIG. 1.

Figure 8:
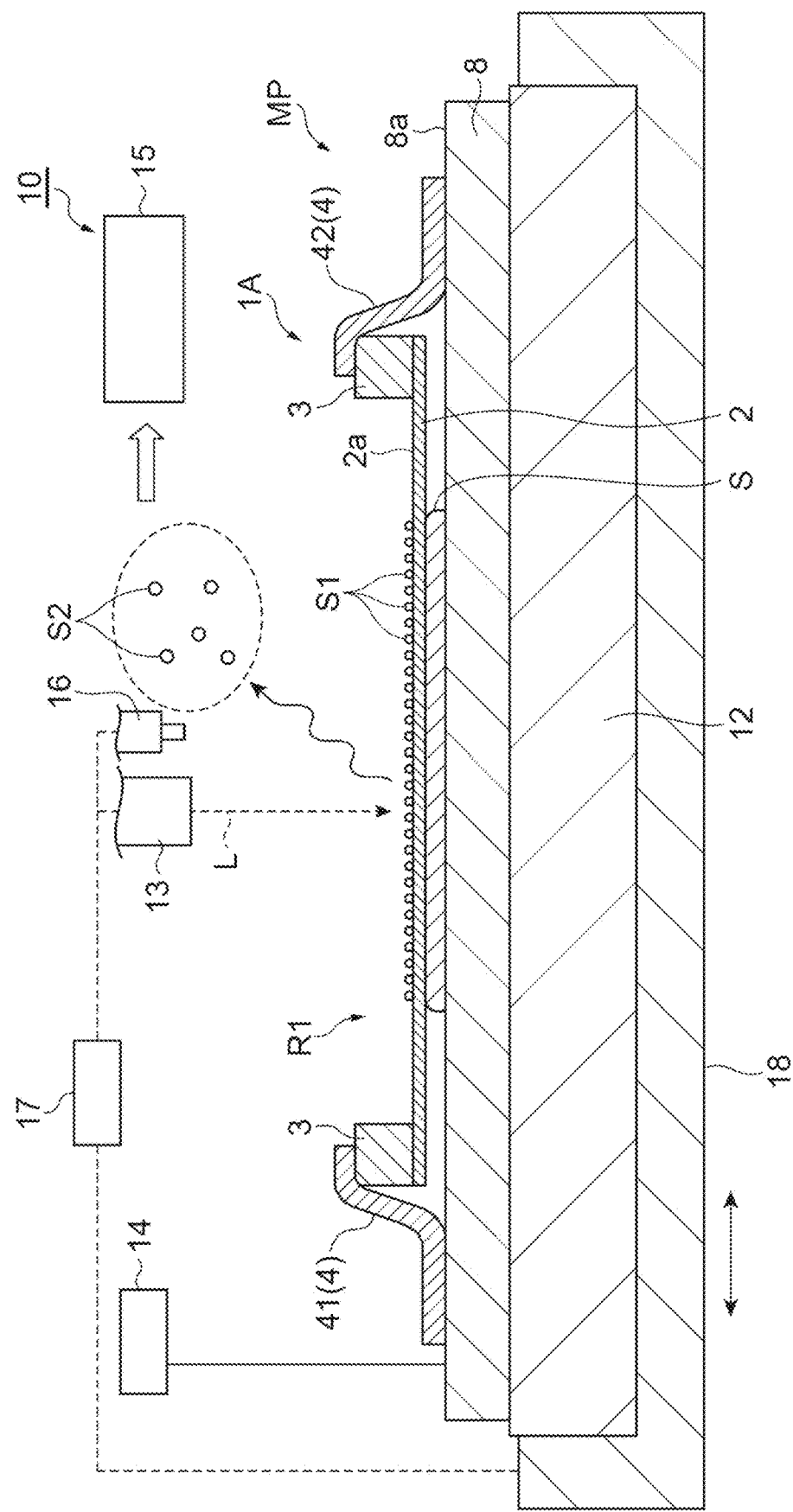

FIG. 8 is a diagram showing steps of a mass spectrometry method using the sample support body shown in FIG. 1.

FIG. 9 is a diagram illustrating a manufacturing process of a sample support body of a second embodiment.

Figure 10:
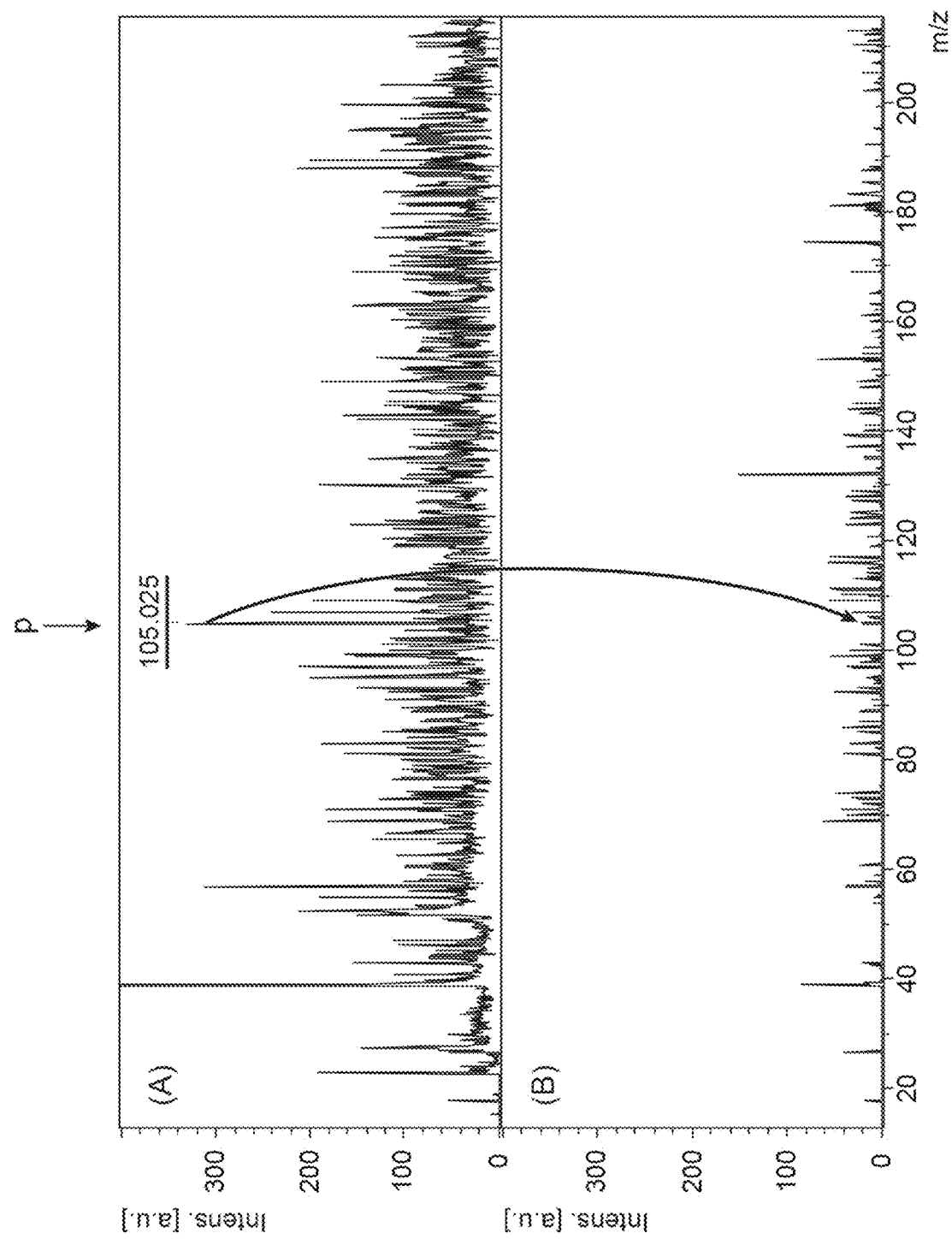

FIG. 10 is a diagram illustrating an example of a mass spectrum obtained by mass spectrometry using the sample support body of the first embodiment and a mass spectrum obtained by mass spectrometry using the sample support body of the second embodiment.

DESCRIPTION OF EMBODIMENTS

Hereinafter, embodiments of the present disclosure will be described with reference to the drawings. In the drawings, the same or corresponding portions are denoted by the same reference numerals, and redundant description will be omitted. In the drawings, some portions are exaggerated for easy understanding of the feature portions according to the embodiments, and may be different from actual dimensions. In the following description, terms such as "upper" and "lower" are used for convenience based on the state shown in the drawings.

First Embodiment

Figure 2:
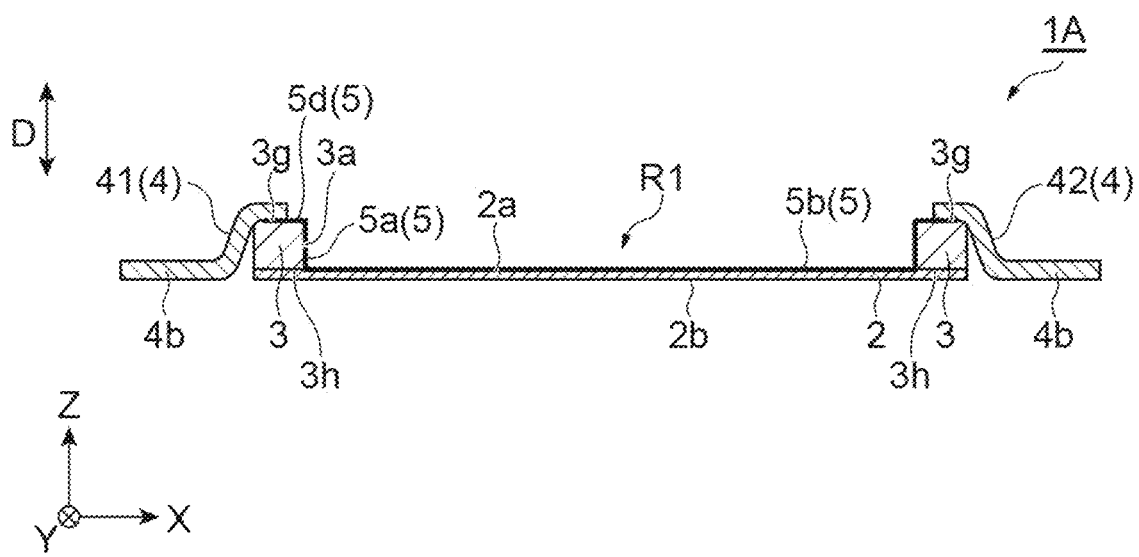
FIG. 2 is a schematic cross-sectional view of the sample support body taken along line II-II shown in FIG. 1.
Figure 3:
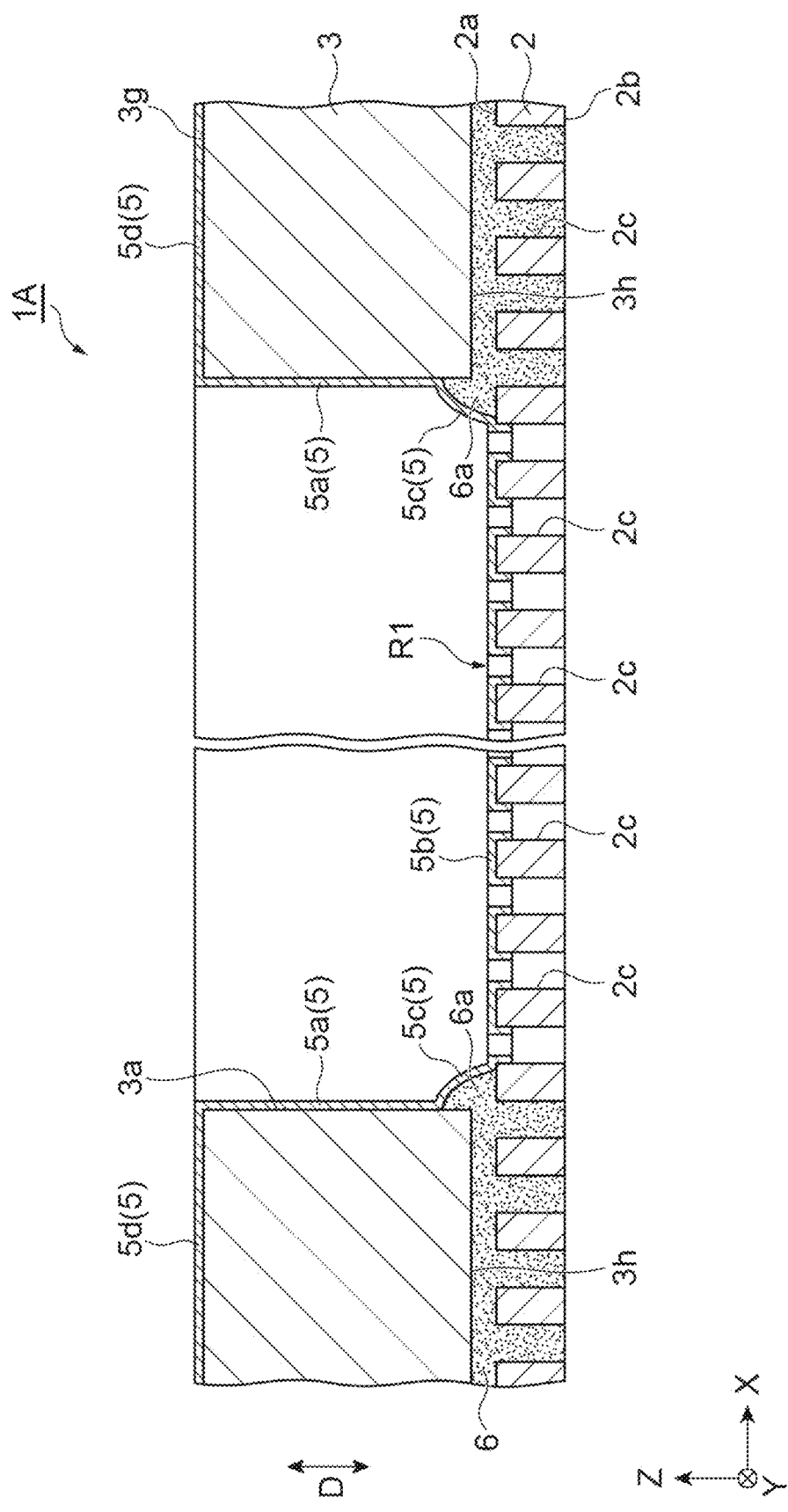
FIG. 3 is a schematic cross-sectional view of the sample support body taken along line III-III shown in FIG. 1.

A sample support body 1A according to the first embodiment will be described with reference to FIGS. 1 to 4. The sample support body 1A is an ionization support substrate used to ionize a sample such as a thin film-like biological sample. As shown in FIGS. 1 to 3, the sample support body 1A includes a substrate 2, a frame 3, a conductive tape 4, and a conductive layer 5. As shown in FIG. 1, the sample support body 1A has a substantially rectangular shape in a plan view. In the present embodiment, a direction along the long side of the sample support body 1A is represented by X-axis direction, a direction along the short side of the sample support body 1A is represented by Y-axis direction, and a direction orthogonal to the X-axis direction and the Y-axis direction (i.e., a thickness direction of the sample support body 1A) is represented by Z-axis direction. As an example, a length of the sample support body 1A in the X-axis direction is about 3 cm, and a length of the sample support body 1A in the Y-axis direction is about 2 cm.

The substrate 2 has a first surface 2a and a second surface 2b opposite to the first surface 2a. As shown in FIG. 3, a plurality of through holes 2c are formed uniformly (in a uniform distribution) in the substrate 2. Each through hole 2c extends along a thickness direction D of the substrate 2 (a direction in which the first surface 2a and the second surface 2b face each other and coincide with the Z-axis direction), and is open to the first surface 2a and the second surface 2b. In FIG. 2, the through hole 2c is not shown.

The substrate 2 is formed of an insulating material in a rectangular plate shape. A length of one side of the substrate 2 when viewed from the thickness direction D is, for example, about several cm. The thickness of the substrate 2 is, for example, about 1 µm to 50 µm. As an example, the thickness of the substrate 2 is 5 µm to 15 µm. The shape of the through hole 2c when viewed from the thickness direction D is, for example, substantially circular. The width of the through hole 2c ranges from 1 nm to 700 nm, for example.

Figure 4:
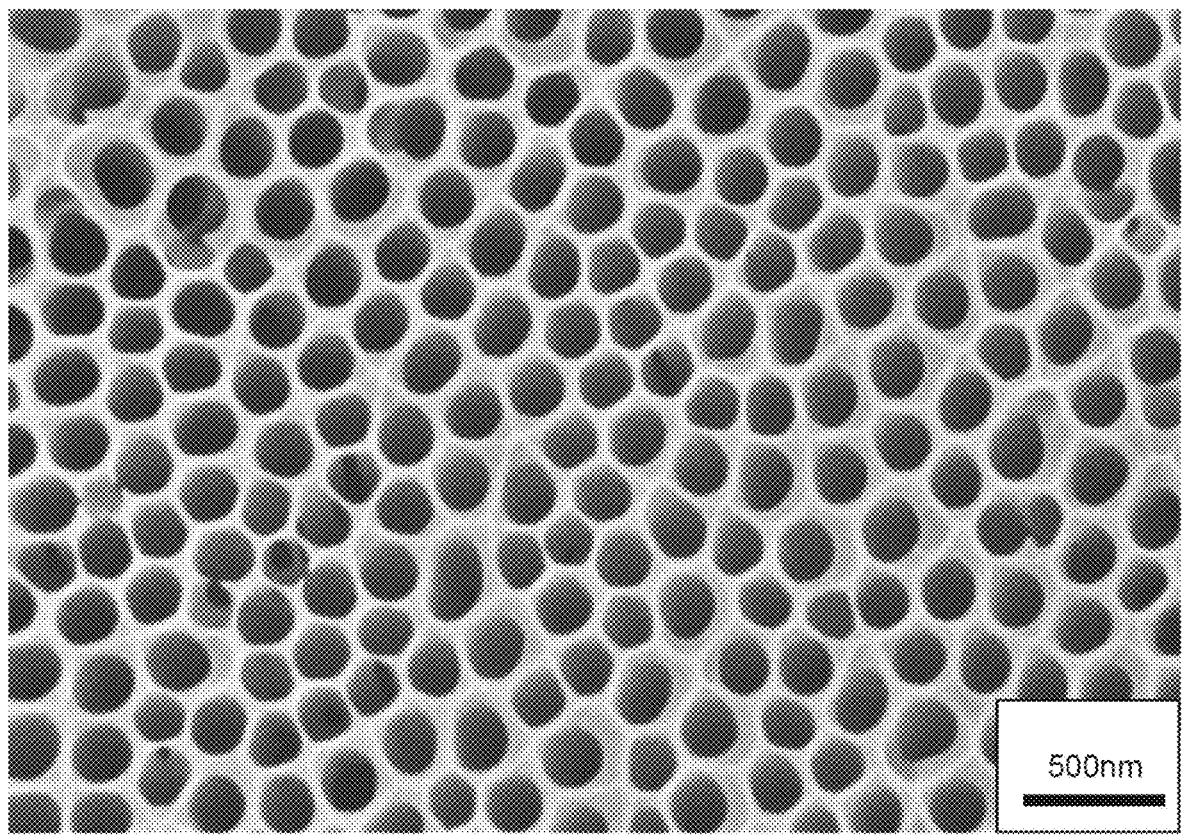
FIG. 4 is a diagram showing an enlarged image of the substrate of the sample support body shown in FIG. 1.

The width of the through hole 2c is a value acquired as follows. First, images of the first surface 2a and the second surface 2b of the substrate 2 are acquired. FIG. 4 shows an example of an SEM image of a part of the first surface 2a of the substrate 2. In the SEM image, a black portion is a through hole 2c, and a white portion is a partition wall between the through holes 2c. Subsequently, by performing, for example, binarization processing on the acquired image of the first surface 2a, a plurality of pixel groups corresponding to a plurality of first openings (openings on the first surface 2a side of the through hole 2c) in the measurement region R1 are extracted, and a diameter of circle having average area of the first openings are acquired based on a size per a pixel. Similarly, by performing, for example, binarization processing on the acquired image of the second surface 2b, a plurality of pixel groups corresponding to a plurality of second openings (openings on the second surface 2b side of the through hole 2c) in the measurement R1 are extracted, and a diameter of circle having average area of the second openings are acquired based on a size per a pixel. Then, the mean value of the diameters of the circles acquired for the first surface 2a and the second surface 2b is acquired as the width of the through hole 2c.

As shown in FIG. 4, a plurality of through holes 2c having substantially constant widths are uniformly formed in the substrate 2. The substrate 2 shown in FIG. 4 is an alumina porous film formed by anodizing Al (aluminum). For example, An Al substrate is subjected to anodization to oxidize a surface portion of the Al substrate and form a plurality of pores (portions to be through holes 2c) in a surface portion of the Al substrate. Subsequently, the oxidized surface portion (anodic oxide film) is peeled off from the Al substrate, and the peeled anodic oxide film is subjected to pore-widening treatment for widening the pores to obtain the above-described substrate 2. The substrate 2 may be formed by anodizing a valve metal other than Al, such as tantalum (Ta), niobium (Nb), titanium (Ti), hafnium (Hf), zirconium (Zr), zinc (Zn), tungsten (W), bismuth (Bi), or antimony (Sb), or may be formed by anodizing silicon (Si).

The frame 3 is provided on the first surface 2a of the substrate 2, and supports the substrate 2 on a side where the first surface 2a is located. The frame 3 has a first face 3h facing the first surface 2a of the substrate 2 and a second face 3g opposite to the first face 3h. In the present embodiment, the frame 3 is formed in a rectangular plate shape larger than the substrate 2 when viewed from the thickness direction D.

An opening part 3a penetrating in a thickness direction of the frame 3 (i.e., thickness direction D) is formed at a substantially central portion of the frame 3. An opening part 3b penetrating in the thickness direction of the frame 3 is formed between one corner of the frame 3 and the opening part 3a. A recessed portion 3d that is recessed toward inside in the X-axis direction is provided in a central portion of an edge portion 3c of the frame 3 in the X-axis direction (that is, an edge portion along the Y-axis direction).

The opening part 3a is formed in a substantially circular shape. In the present embodiment, the opening part 3a has a shape in which portions of a circle (portions facing each other in one direction) are cut out in an arcuate shape. Specifically, the opening part 3a has a shape in which a part of a circle is cut out in an arch shape so that edge portions on both sides in the Y-axis direction are parallel to the X-axis direction. As an example, the width of the opening part 3a in the Y-axis direction is about 1.5 cm. A portion of the substrate 2 corresponding to the opening part 3a (i.e., a portion overlapping the opening part 3a when viewed from the thickness direction D) functions as a measurement region R1 for measurement (ionization) of the sample. That is, the measurement region R1 is defined by the opening part 3a provided in the frame 3. In other words, the opening part 3a is open to the first face 3h and the second face 3g so as to correspond to the measurement region R1. That is, the frame 3 is formed so as to surround the measurement region R1 of the substrate 2 when viewed from the thickness direction D.

The opening part 3b is formed in a circular shape that is smaller than the opening part 3a. By way of example, the diameter of the opening part 3b is about 1 mm A portion of the substrate 2 corresponding to the opening part 3b (i.e., a portion overlapping the opening part 3b when viewed from the thickness direction D) functions as a calibration region R2 for calibration. The calibration region R2 may be used as a region for mass calibration. For example, before starting measurement of a sample (mass spectrometry method to be described later), a sample for mass calibration (for example, a peptide or the like) is placed in the calibration region R2 and measurement is performed, thereby making it possible to correct the mass spectrum. By performing such correction of the mass spectrum before measurement of the measurement target sample, it is possible to obtain an accurate mass spectrum of the measurement target sample when the measurement target sample is measured.

As described above, since a plurality of through holes 2c are uniformly formed in the substrate 2, both the measurement region R1 and the calibration region R2 are regions including a plurality of through holes 2c. The opening ratio of the through hole 2c in the measurement region R1 (the ratio of the through hole 2c to the measurement region 2c when viewed from the thickness direction D) is practically 10 to 80%, and particularly preferably 60 to 80%. The sizes of the plurality of through holes 2c may be different from each other, or the plurality of through holes 2c may be partially connected to each other. The calibration region R2 is the same as the measurement region R1.

The frame 3 is made of, for example, metal or ceramics. In the present embodiment, the frame 3 is formed of a non-magnetic material having acid resistance. Examples of such a material include titanium and stainless steel (SUS). In the present embodiment, the frame 3 is formed of SUS. The outer shape of the sample support body 1A is mainly defined by the frame 3. That is, the length of the frame 3 in the X-axis direction is about 3 cm, and the length of the frame 3 in the Y-axis direction is about 2 cm. The thickness of the frame 3 is, for example, equal to or less than the 3 mm By way of example, the thickness of the frame 3 is 0.2 mm.

In the present embodiment, as shown in FIG. 1, when viewed from the thickness direction D, the substrate 2 fits between the pair of edge portions 3e of the frame 3 along the X-axis direction and fits between the bottom portions 3f of each of the pair of recessed portions 3d of the frame 3. That is, when viewed from the thickness direction D, only the measurement region R1 and the calibration region R2 of the substrate 2 are exposed to the outside. That is, a portion of the substrate 2 other than the measurement region R1 and the calibration region R2 is bonded to the frame 3 by the adhesive layer 6. Since the substrate 2 is bonded to and supported by the frame 3 in this manner, handling of the sample support body 1A is facilitated and deformation of the substrate 2 due to a temperature change or the like is suppressed.

As shown in FIG. 3, the frame 3 is bonded to the first surface 2a of the substrate 2 by the adhesive layer 6. The adhesive layer 6 is formed between the first surface 2a of the substrate 2 and the first face 3h of the frame 3, and bonds the substrate 2 and the frame 3. In FIG. 2, the adhesive layer 6 is not shown. The adhesive layer 6 may be formed of, for example, an adhesive (for example, low melting point glass, adhesive for vacuum, or the like) that releases less gas. The adhesive layer 6 may be formed of a conductive adhesive or may be formed by applying a metal paste. In addition, the adhesive layer 6 may be formed of a UV curable adhesive (photo-curable adhesive), an inorganic binder, or the like.

Examples of the UV curable adhesive include an acrylic adhesive, an epoxy-based adhesive, and the like. Examples of the inorganic binder include Ceramabond (registered trademark) manufactured by Audec company, Aron ceramic (registered trademark) manufactured by Toagosei company, and the like. In the present embodiment, as an example, the adhesive layer 6 is formed of UV curable adhesive.

As shown in FIG. 3, the adhesive layer 6 has a protruding portion 6a that protrudes from the inner surface of the opening part 3a of the frame 3 toward the measurement region R1 when viewed from the thickness direction D. In the present embodiment, as an example, the protruding portion 6a has a portion that protrudes toward the second face 3g from the first face 3h of the frame 3 (that is, a portion formed on the inner surface of the opening part 3a of the frame 3). In a portion of the substrate 2 that overlaps with the adhesive layer 6 when viewed from the thickness direction D, a portion of the adhesive layer 6 is in the through holes 2c. In other words, the adhesive layer 6 penetrates into the through holes 2c. The protruding amount of the protruding portion 6a (a distance between an edge portion of the protruding portion 6a on the measurement region R1 side and an inner surface of the opening part 3a when viewed from the thickness direction D) is, for example, about 20 μm to 50 μm.

The conductive tape 4 is a member for fixing the sample support body 1A when measurement using the sample support body 1A is performed. In the present embodiment, the conductive tape 4 is used to fix the sample support body 1A to the placement surface 8a (see FIG. 7) of the slide glass 8. However, the member to which the sample support body 1A is fixed is not limited to the slide glass 8. The conductive tape 4 is formed of a conductive material. The conductive tape 4 is, for example, an aluminum tape, a carbon tape, or the like. The thickness of the conductive tape 4 is, for example, 100 μm.

The conductive tape 4 is pasted on the second face 3g of the frame 3. In this embodiment, the conductive tape 4 is provided on both sides of the frame 3 in the X-axis direction. Specifically, the conductive tape 4 includes a conductive tape 41 provided on one side (left side in FIG. 1) of the frame 3 in the X-axis direction and a conductive tape 42 provided on the other side (right side in FIG. 1) of the frame 3 in the X-axis direction.

The conductive tape 41 is provided so as not to cover the measurement region R1 and the calibration region R2 on one side (left side in FIG. 1) of the central portion of the frame 3 in the X-axis direction. The conductive tape 41 is provided with a circular opening part 4a for exposing the calibration region R2. As shown in FIG. 1, in the present embodiment, the edge portion of the conductive tape 41 is slightly spaced apart from the edge portions 3c and 3e of the frame 3, the edge portion of the opening part 3a of the frame 3, and the edge portion of the opening part 3b of the frame 3. On the other hand, the conductive tape 41 is also provided at a position overlapping the space formed by the recessed portion 3d of the frame 3 when viewed from the thickness direction D. That is, the conductive tape 41 has a portion 4b that does not overlap the frame 3 when viewed from the thickness direction D (i.e., a portion that overlaps a space formed by the recessed portion 3d).

The conductive tape 42 is provided so as not to cover the measurement region R1 on the other side (right side in FIG. 1) of the central portion of the frame 3 in the X-axis direction. As shown in FIG. 1, in the present embodiment, the edge portion of the conductive tape 42 is slightly spaced apart from the edge portions 3c and 3e of the frame 3, and the edge portion of the opening part 3a of the frame 3. On the other hand, the conductive tape 42 is also provided at a position overlapping the recessed portion 3d of the frame 3 when viewed from the thickness direction D. That is, the conductive tape 42 has a portion 4b that does not overlap the frame 3 when viewed from the thickness direction D (i.e., a portion that overlaps a space formed by the recessed portion 3d).

The portion 4b of each conductive tape 41, 42 is attached to the placement surface 8a of the slide glass 8, so that the sample support body 1A is fixed to the slide glass 8 (see FIG. 7).

The conductive layer 5 is provided so as to cover the substrate 2, the frame 3, and the adhesive layer 6. In particular, the conductive layer 5 has a first portion 5a, a second portion 5b, a third portion 5c, and a fourth portion 5d. The first portion 5a is a portion provided along the inner surface of the opening part 3a of the frame 3. The second portion 5b is a portion provided along the first surface 2a of the measurement region R1 of the substrate 2. The third portion 5c is a portion provided along a surface of the protruding portion 6a so as to connect the first portion 5a and the second portion 5b. The fourth portion 5d is a portion provided along the second face 3g of the frame 3 of the peripheral edge portion of the opening part 3a of the frame 3. In FIG. 2, a portion where the conductive layer 5 is formed is indicated by a thick line. However, as described above, since the adhesive layer 6 is not shown in FIG. 2, the third portion 5c along the protruding portion 6a is not shown.

As shown in FIG. 3, the first portion 5a, the second portion 5b, the third portion 5c, and the fourth portion 5d are formed in one piece (integrally). The second portion 5b covers a portion where the through hole 2c is not formed in the first surface 2a of the substrate 2 in the measurement region R1. That is, the second portion 5b is provided so as not to block each through hole 2c. Therefore, in the measurement region R1, each through hole 2c is exposed to the opening part 3a.

Also in the calibration region R2, as in the measurement region R1 shown in FIG. 3, the conductive layer 5 has a portion (a portion corresponding to the first portion) provided along the inner surface of the opening part 3b of the frame 3, a portion (a portion corresponding to the second portion) provided along the first surface 2a of the calibration region R2, a portion (a portion corresponding to the third portion) provided along a protruding portion (a portion protruding from the inner surface of the opening part 3b of the frame 3 toward the calibration region R2 when viewed from the thickness direction D) of the adhesive layer 6, and a portion (a portion corresponding to the fourth portion) provided along the second face 3g of the frame 3 at the edge portion of the opening part 3b. These portions are formed in one piece (integrally).

The conductive layer 5 is formed of a conductive material. The conductive layer 5 is formed of, for example, Pt (platinum) or Au (gold). As the material of the conductive layer 5, it is preferable to use a metal having low affinity (reactivity) with the sample and high conductivity for the following reason.

For example, when the conductive layer 5 is formed of a metal such as Cu (copper) having high affinity with a sample such as a protein, the sample may be ionized in a state where Cu atoms are attached to sample molecules in the process of ionization of the sample (biological sample) described later, and the detection result in mass spectrometry described later may be shifted by the amount of the attached Cu atoms. Therefore, it is preferable to use a metal having a low affinity with the sample as the material of the conductive layer 5.

On the other hand, a metal having higher conductivity makes it easier to apply a constant voltage easily and stably. Therefore, when the conductive layer 5 is formed of a material having high conductivity, a voltage can be uniformly applied to the first surface 2a of the substrate 2 in the measurement region R1. In addition, a metal having higher conductivity tends to have higher thermal conductivity. Therefore, when the conductive layer 5 is formed of a metal having high conductivity, the energy of the laser light (energy beam) applied to the substrate 2 can be efficiently transmitted to the sample through the conductive layer 5. Therefore, as the material of the conductive layer 5, a metal having high conductivity is preferably used.

From the above viewpoint, for example, Pt, Au, or the like is preferably used as the material of the conductive layer 5. The conductive layer 5 is formed to be about 1 nm to 350 nm thick by, for example, vapor deposition or sputtering. As a material of the conductive layer 5, for example, chromium (Cr), nickel (Ni), titanium (Ti), or the like may be used.

[Method of Manufacturing Sample Support Body 1A]

Next, an example of a method of manufacturing a sample support body 1A will be described with reference to FIGS. 5 and 6. First, the insulating substrate 2 described above is prepared (first step). As described above, as an example, the substrate 2 is obtained by anodizing the Al substrate and peeling off the oxidized surface portion (anodic oxide film). Subsequently, the above-described frame 3 is prepared (second step).

Subsequently, as shown in the left portion of FIG. 5, an adhesive B, which is a material of the adhesive layer 6, is applied to the edge portion of the opening part 3a in the first face 3h of the frame 3 (third step). Subsequently, as shown in the center portion of FIG. 5, the substrate 2 is disposed so as to overlap the first face 3h to which the adhesive B is applied and the opening part 3a in a state in which the first face 3h is located above the second face 3g and so that the first surface 2a faces the first face 3h. Thus, the substrate 2 and the frame 3 are bonded to each other via the adhesive B. At this time, as shown in the right portion of FIG. 5, the adhesive B is stretched by the substrate 2, and a part of the adhesive B enters the through holes 2c of the substrate 2 on the first face 3h of the frame 3. Also, a portion of the adhesive B leaks from the edge portion of the opening part 3a into the opening part 3a. As a result, a protruding portion 6a that protrudes from the inner surface of the opening part 3a toward the measurement region R1 when viewed from the thickness direction D is formed by a portion of the adhesive B (fourth step). When the processing up to the fourth step is completed, a portion of the sample support body 1A shown in FIG. 1 other than the conductive tape 4 and the conductive layer 5 is obtained.

The protruding portion 6a formed in the fourth step has a portion formed on the inner surface of the opening part 3a (i.e., a portion along the inner surface of the opening part 3a). In the present embodiment, since the first face 3h is located above the second face 3g as described above, a part of the adhesive B leaked from the edge portion of the opening part 3a into the opening part 3a drips along the inner surface of the opening part 3a by gravity. As a result, a protruding portion 6a having a portion along the inner surface of the opening part 3a as described above is obtained.

Subsequently, the substrate 2 and the frame 3 bonded to each other through the adhesive layer 6 are immersed in an acidic liquid to perform a pore-widening treatment for widening the plurality of through holes 2c of the substrate 2. As an example, the width of the through hole 2c before the pore-widening treatment is about 50 nm, and the width of the through hole 2c after the pore-widening treatment is about 200 nm.

Subsequently, as shown in the left portion of FIG. 6, vapor deposition or sputtering of metal (Pt in the present embodiment) is performed on the substrate 2 and the frame 3 from a side where the first surface 2a of the substrate 2 is located. Accordingly, as shown in the right portion of FIG. 6, the conductive layer 5 having the first portion 5a, the second portion 5b, the third portion 5c, and the fourth portion 5d is formed (fifth step). By the above processing, the sample support body 1A shown in FIG. 1 is obtained.

[Mass Spectrometry Method Using Sample Support Body 1A]

Next, an example of a mass spectrometry method (including an ionization method) using a sample support body 1A will be described with reference to FIGS. 7 and 8. In FIGS. 7 and 8, illustration of the through hole 2c, the conductive layer 5, and the adhesive layer 6 is omitted.

First, as shown in (A) of FIG. 7, a sample S is prepared. Specifically, the sample S is placed on the placement surface 8a of the slide glass 8 (placement unit). The slide glass 8 is a glass substrate on which a transparent conductive film such as an indium tin oxide (ITO) film is formed, and the surface of the transparent conductive film serves as a placement surface 8a. Note that the mounting portion on which the sample S is mounted is not limited to the slide glass 8, and a member capable of ensuring conductivity (for example, a substrate made of a metal material such as stainless steel) may be used as the mounting portion. The sample S is, for example, a biological sample (water-containing sample). The sample S is, for example, a liver section of a mouse. In order to smoothly move the component S1 (see (C) of FIG. 7) of the sample S, solutions (for example, an acetonitrile mixed solution, acetone, or the like) for reducing the viscosity of the component S1 may be added to the sample S.

Subsequently, as shown in (B) of FIG. 7, the sample support body 2b is arranged on the sample S so that the second surface 2b of the substrate 2 faces the sample S. The portion 4b of the conductive tape 4 of the sample support body 1A is attached to the placement surface 8a, so that the sample support body 1A is fixed to the slide glass 8.

Subsequently, as illustrated in (C) of FIG. 7, the component S1 of the sample S moves from the second surface 2b side of the substrate 2 toward the first surface 2a side of the substrate 2 via the through hole 2c (see FIG. 3) by the capillary phenomenon. Then, the component S1 moved to the first surface 2 aside of the substrate 2 remains on the first surface 2a side due to surface tensions.

Subsequently, as shown in FIG. 8, the slide glass 8, the sample S, and the sample support body 1A (hereinafter referred to as "measurement plate MP") that are integrally fixed are mounted on a support unit 12 of the mass spectrometer 10.

The mass spectrometer 10 includes a support unit 12, a sample stage 18, a camera 16, an irradiation unit 13, a voltage application unit 14, an ion detection unit 15, and a controller 17. The measurement plate MP is placed on the support unit 12. The support unit 12 is placed on a sample stage 18. The irradiation unit 13 irradiates the first surface 2a of the sample support body 1A with an energy beam such as laser light L. The voltage application unit 14 applies a voltage to the first surface 2a of the sample support body 1A. The ion detection unit 15 detects a component (sample ion S2) of the ionized sample S. The camera 16 is a device that acquires a camera image including an irradiation position of the laser light L by the irradiation unit 13. The camera 16 is, for example, a small CCD camera attached to the irradiation unit 13.

The controller 17 controls operations of the sample stage 18, the camera 16, the irradiation unit 13, the voltage application unit 14, and the ion detection unit 15. The controller 17 is, for example, a computer device including a processor (for example, a CPU or the like), a memory (for example, a ROM, a RANI or the like), and the like.

As shown in FIG. 8, the voltage application unit 14 applies a voltage to the conductive layer 5 (see FIG. 2) of the sample support body 1A through the placement surface 8a of the slide glass 8 and the conductive tape 4. Subsequently, the controller 17 operates the irradiation unit 13 based on the image acquired by the camera 16. Specifically, the controller 17 operates the irradiation unit 13 so that the first surface 2a in a laser irradiation range (for example, a region in which the sample S specified based on the image acquired by the camera 16 exists in the measurement region R1) is irradiated with the laser light L.

As an example, the controller 17 moves the sample stage 18 and controls an irradiation operation (irradiation timing or the like) of the laser light L by the irradiation unit 13. That is, the controller 17 causes the irradiation unit 13 to perform irradiation of the laser light L after confirming that the sample stage 18 has moved by a predetermined distance. For example, the controller 17 repeats movement (scanning) of the sample stage 18 and irradiation of the laser light L by the irradiation unit 13 so as to perform raster scanning within the laser irradiation range. The irradiation position on the first surface 2a may be changed by moving the irradiation unit 13 instead of the sample stage 18, or by moving both the sample stage 18 and the irradiation unit 13.

As described above, when the laser light L is irradiated to the first surface 2a within the laser irradiation range while the voltage is applied to the conductive layer 5, the component S1 moved to the first surface 2a side is ionized and the sample ion S2 (ionized component S1) is emitted. In detail, the energy is transferred from the conductive layer 5 absorbing the energy of the laser light L to the component S1 moved to the first surface 2a side of the substrate 2, and the component S1 acquiring the energy is vaporized and acquires charges to become the sample ion S2. Each of the above steps corresponds to method of ionizing the sample S using the sample support body 1A (here, as an example, a laser desorption ionization method as a part of a mass spectrometry method).

The discharged sample ion S2 moves toward a ground electrode (not shown) provided between the sample support body 1A and the ion detection unit 15 while being accelerated. That is, the sample ion S2 moves toward the ground electrode while being accelerated by the potential difference generated between the conductive layer 5 to which the voltage is applied and the ground electrode. Then, the sample ion S2 is detected by the ion detection unit 15.

The detection result of the sample ion S2 detected by the ion detection unit 15 is associated with the irradiation position of the laser light L. Specifically, the ion detection unit 15 detects the sample ion S2 individually for each position within the laser irradiation range. Thus, a distribution image (MS mapping data) indicating the mass distribution of the sample S is acquired. Further, a two-dimensional distribution of molecules constituting the sample S can be imaged. That is, imaging mass spectrometry can be performed. Here, the mass spectrometer 10 is a mass spectrometer using time-of-flight mass spectrometry (TOF-MS).

[Effect]

In the sample support body 1A, a frame 3 is formed on a first surface 2a of a substrate 2, and a measurement region R1 is defined by an opening part 3a of the frame 3. That is, a portion of the substrate 2 that overlaps the opening part 3a of the frame 3 when viewed from the thickness direction D functions as the measurement region R1. The adhesive layer 6 that bonds the substrate 2 and the frame 3 has a protruding portion 6a that protrudes from the inner surface of the opening part 3a toward the measurement region R1 when viewed from the thickness direction D. Thus, the conductive layer 5 has not only a first portion 5a along the inner surface of the opening part 3a and a second portion 5b along the first surface 2a of the measurement region R1 but also a third portion 5c along the surface of the protruding portion 6a. If the protruding portion 6a is not formed (for example, if the edge portion on a side where the measurement region R1 is located of the adhesive layer 6 is located outside the opening part 3a when viewed from the thickness direction D), the conductive layer 5 may not be appropriately formed on the surface of the adhesive layer 6 buried between the frame 3 and the substrate 2, and the first portion 5a and the second portion 5b may be separated from each other. As a result, conduction may not be established between the first portion 5a and the second portion 5b. On the other hand, according to the sample support body 1A, conduction between the first portion 5a and the second portion 5b of the conductive layer 5 can be reliably achieved. In other words, the first portion 5a and the second portion 5b can be appropriately connected via the third portion 5c. Thus, for example, by applying a voltage to the frame 3, a voltage can be applied to the second portion 5b via the first portion 5a and the third portion 5c.

In the above-described embodiment, a voltage is applied to the frame 3 via the conductive tape 4. As described above, according to the sample support body 1A, it is possible to appropriately apply a voltage to the first surface 2a of the measurement region R1 (that is, the second portion 5b of the conductive layer 5). As a result, the above-described mass spectrometry (detection of a sample ion S2) can be appropriately performed.

Also, the protruding portion 6a has a portion formed on the inner surface of the opening part 3a. In this case, since the edge portion of the opening part 3a of the frame 3 on a side where the first surface 2a is located is supported in a hook shape by the protruding portion 6a, the substrate 2 may be stably fixed to the frame 3.

In a portion of the substrate 2 that overlaps with the adhesive layer 6 when viewed from the thickness direction D, a portion of the adhesive layer 6 is in the through hole 2c. In this case, the substrate 2 can be more stably fixed to the frame 3.

The frame 3 is formed of a non-magnetic material. If the frame 3 is formed of a magnetic material, when the component S1 of the sample S disposed in the measurement region R1 is ionized by irradiating the measurement region R1 with the laser light L, the frame 3 may affect the trajectory (flight path toward the ground electrode) of the ion (sample ion S2). On the other hand, when the frame 3 is formed of a non-magnetic material, it is possible to prevent the above-described influence on the trajectory of the ion.

The adhesive layer 6 is formed of a photo-curable adhesive. In the present embodiment, as an example, the adhesive layer 6 is formed of UV curable adhesive made of acrylic adhesive or epoxy-based adhesive. In this case, it is not necessary to heat the adhesive layer 6 to cure it. Therefore, it is possible to prevent the occurrence of deflection caused by the heat treatment (deflection caused by a difference in thermal expansion coefficient between the frame 3 and the substrate 2). In addition, since such heat treatment is not necessary, it is possible to use the frame 3 having a large difference in thermal expansion coefficient from the substrate 2 without worrying about the occurrence of the deflection. Therefore, it is possible to improve the degree of freedom in selecting the material of the frame 3.

The substrate 2 is formed by anodizing a silicon or a valve metal, and the frame 3 is formed of an acid resistant metal. In this case, after the substrate 2 is fixed to the frame 3 via the adhesive layer 6, pore-widening treatment for widening the through hole 2c of the substrate 2 by immersing the substrate 2 and the frame 3 in an acidic liquid may be performed. That is, by using the frame 3 formed of the metal having the acid resistance, the frame 3 may be prevented from being corroded by the acidic solution during the pore-widening treatment. In the present embodiment, the frame 3 is formed of SUS. In this case, the frame 3 can be made of an inexpensive material.

Figure 5:
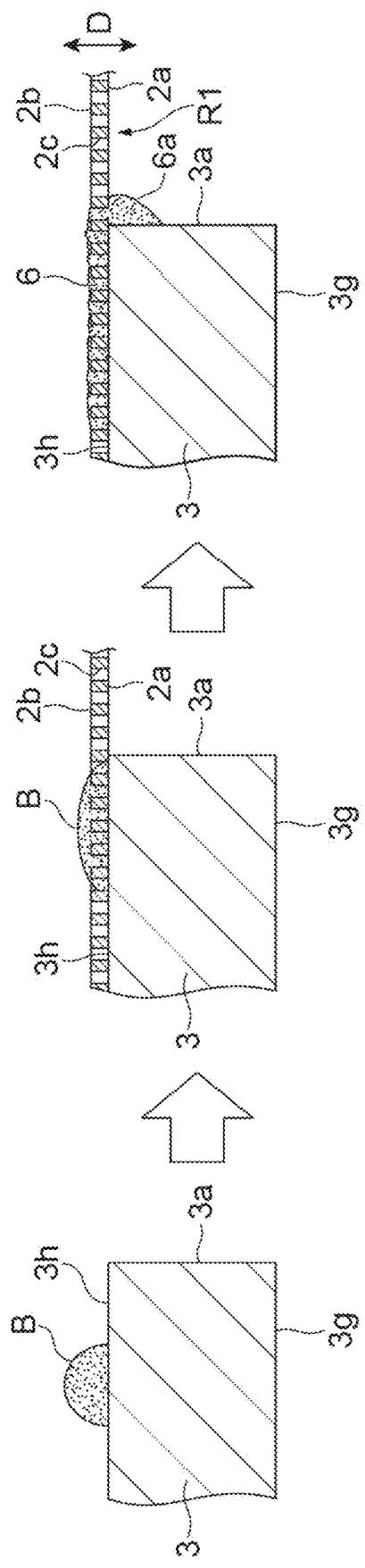
FIG. 5 is a view showing a manufacturing process of the sample support body shown in FIG. 1.
Figure 6:
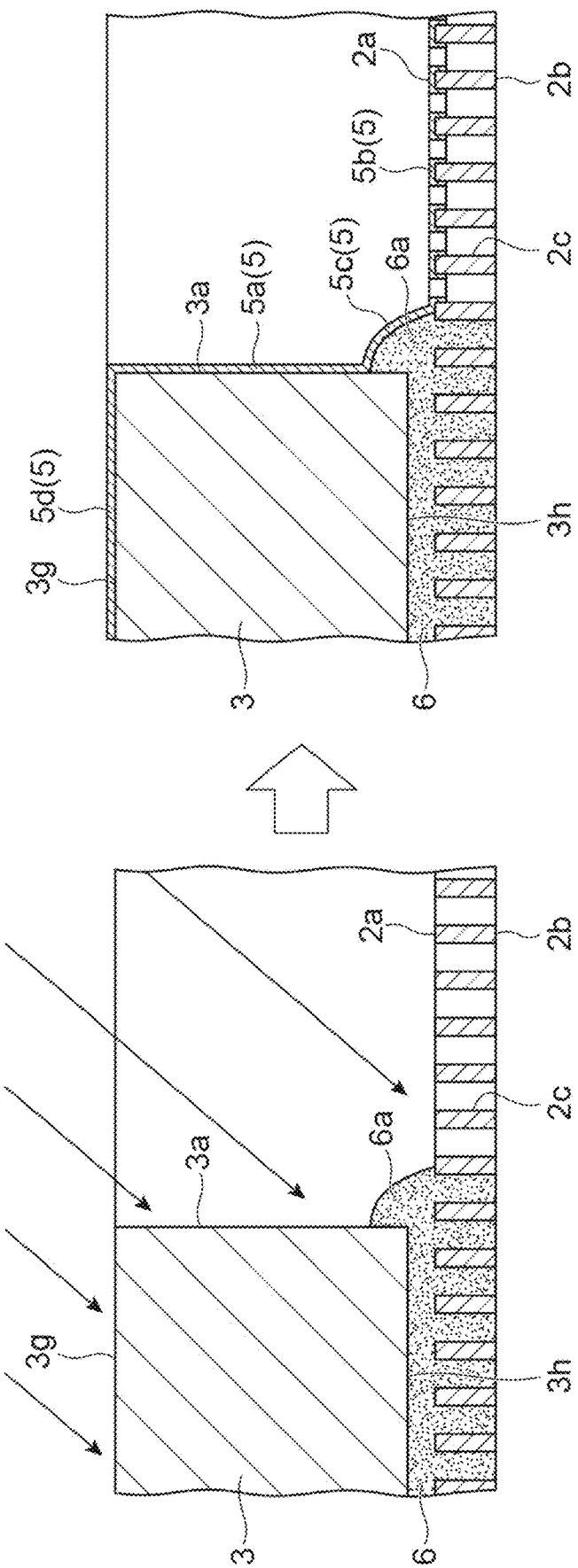
FIG. 6 is a view showing a manufacturing process of the sample support body shown in FIG. 1.

In the method (first step to fifth step) of manufacturing the sample support body 1A described above, in the fourth step, the substrate 2 is disposed on the first face 3h of the frame 3 from above in a state in which the first face 3h of the frame 3 is located above the second face 3g, whereby the adhesive B applied to the edge portion of the opening part 3a in the first face 3h is stretched, and as a result, the protruding portion 6a is formed (see FIG. 5). Then, after the substrate 2 and the frame 3 are bonded via the adhesive layer 6 formed of the adhesive B, the conductive layer 5 is formed by vapor deposition or sputtering of metal (Pt in the present embodiment), thereby forming the conductive layer 5 in which the first portion 5a and the second portion 5b are appropriately connected via the third portion 5c along the protruding portion 6a (see FIG. 6). As described above, according to the above-described manufacturing method, it is possible to suitably obtain a sample support body 1A exhibiting the above-described effects.

Further, in the fourth step, a protruding portion 6a having a portion formed on the inner surface of the opening part 3a is formed. In this case, a sample support body 1A in which the substrate 2 is stably fixed to the frame 3 can be obtained.

In addition, the manufacturing method may further include a step of performing a pore-widening treatment between the fourth step and the fifth step to widen the plurality of through holes 2c by immersing the substrate 2 and the frame 3 in the acidic liquid. The frame 3 is formed of a metal having acid resistance. In this case, it is possible to prevent the frame 3 from being corroded by the acidic solution during the pore-widening treatment.

In addition, the adhesive layer 6 (adhesive B) is a photo-curable adhesive. In the fourth step, the substrate 2 and the frame 3 are bonded to each other by irradiating the adhesive B with light. In this case, since it is not necessary to heat the adhesive B in order to cure the adhesive B, it is possible to prevent the occurrence of deflection due to the heat treatment (deflection caused by a difference in thermal expansion coefficient between the frame 3 and the substrate 2). In addition, since such heat treatment is not necessary, it is possible to use the frame 3 having a large difference in thermal expansion coefficient from the substrate 2 without worrying about the occurrence of the deflection. Therefore, it is possible to improve the degree of freedom in selecting the material of the frame 3.

Second Embodiment

A sample support body 1B according to the second embodiment will be described with reference to FIG. 9. The sample support body 1B is different from the sample support body 1A in that it further includes a metal oxide film 7. Other configurations of the sample support body 1B are the same as those of the sample support body 1A. The metal oxide film 7 covers the surface of the adhesive layer 6 so that the surface of the adhesive layer 6 is not exposed to the outside. In the present embodiment, the metal oxide film 7 is formed of aluminum oxide ($Al_2O_3$). As an example, the metal oxide film 7 is formed between the fourth step and the fifth step (after the pore-widening treatment). More specifically, the metal oxide film 7 is formed by an atomic layer deposition method (ALD) on the surfaces of the substrate 2 and the frame 3 in a state before the conductive layer 5 is formed. Thus, as shown in the left portion of FIG. 9, the metal oxide film 7 is formed on the entire surfaces of the substrate 2 and the frame 3. That is, the metal oxide film 7 is formed on the second face 3g of the frame 3, the inner surface of the opening part 3a, the first surface 2a of the substrate 2, the second surface 2b of the substrate 2, the inner surface of the through hole 2c, and the surface of the adhesive layer 6 (the portion exposed to the second surface 2b side through the through hole 2c and the protruding portion 6a). Thus, the adhesive layer 6 is confined inside the metal oxide film 7.

In the sample support body 1B, the conductive layer 5 is formed by performing vapor deposition or sputtering of metal (for example, Pt) after the metal oxide film 7 is formed. That is, in the sample support body 1B, the first portion 5a of the conductive layer 5 is provided on the inner surface of the opening part 3a via the metal oxide film 7. The second portion 5b of the conductive layer 5 is provided on the first surface 2a of the substrate 2 via the metal oxide film 7. The third portion 5c of the conductive layer 5 is provided on the surface of the protruding portion 6a via the metal oxide film 7. The fourth portion 5d of the conductive layer 5 is provided on the second face 3g of the frame 3 via the metal oxide film 7.

According to the sample support body 1B and the manufacturing method thereof, since the adhesive layer 6 is confined inside the metal oxide film 7, for example, in a case where the conductive layer 5 is formed by vapor deposition or the like, it is possible to prevent generation of gas from the adhesive layer 6. This makes it possible to prevent gas generated from the adhesive layer 6 during formation of the conductive layer 5 from mixing with the conductive layer 5. In addition, when the component S1 of the sample S disposed in the measurement region R1 is ionized by irradiating the laser light L to the measurement region R1, it is possible to prevent the component of the adhesive layer 6 (that is, the component mixed in the conductive layer 5) from being ionized together with the component S1 of the sample S. As a result, when performing mass spectrometry using the sample support body 1B, it is possible to reduce noise caused by ionization of components of the adhesive layer 6.

FIG. 10 is a diagram showing an example of a mass spectrum (A) obtained by mass spectrometry using a sample support body 1A and a mass spectrum (B) obtained by mass spectrometry using a sample support body 1B. Here, the conductive layer 5 (Pt) of the sample support body 1A is 20 nm thick, the metal oxide film 7 ($Al_2O_3$) of the sample support body 1B is 10 nm thick, and the conductive layer 5 (Pt) of the sample support body 1B is 20 nm thick. A point p at which the mass-to-charge ratio (m/z) is 105.025 corresponds to the material of the adhesive layer 6. As illustrated in FIG. 10, it was confirmed that the noise at the point p caused by the material of the adhesive layer 6 can be reduced to about 1/16 by using the sample support body 1B in which the adhesive layer 6 is covered with the metal oxide film 7 (that is, a structure in which mixing of the component (gas) of the adhesive layer 6 into the conductive layer 5 is prevented). It was also confirmed that noise was reduced as a whole in regions other than the point p.

Further, the metal oxide film 7 is formed by ALD. In this case, as illustrated in the left portion of FIG. 9, the metal oxide film 7 may be reliably formed on the entire portion exposed to the outside of the adhesive layer 6 (adhesive B).

MODIFICATION

Although some embodiments of the present disclosure have been described above, the present disclosure is not limited to the above-described embodiments. For example, the material and shape of each component are not limited to those described above, and various materials and shapes may be adopted.

For example, although one measurement region R1 is defined by one opening part 3a provided in the frame 3 in the above-described embodiment, a plurality of measurement regions R1 may be provided in a sample support body.

The conductive layer 5 provided on the substrate 2 may be provided at least on the first surface 2a. Therefore, the conductive layer 5 may be provided on, for example, the second surface 2b in addition to the first surface 2a, or may be provided on the whole or a part of the inner surface of each through hole 2c.

In the mass spectrometry method using sample support body, a target to which a voltage is applied by the voltage application unit 14 is not limited to the placement surface 8a. For example, the voltage may be directly applied to the frame 3 or the conductive layer 5.

In the mass spectrometry method using the sample support body, the mass spectrometer 10 may be a scanning type mass spectrometer or a projection type mass spectrometer. In the case of the scanning type, a signal of one pixel having a size corresponding to the spot diameter of the laser light L is acquired for each irradiation of the laser light L by the irradiation unit 13. That is, scanning (change of the irradiation position) and irradiation of the laser light L are performed for each pixel. On the other hand, in the case of the projection type, a signal of an image (a plurality of pixels) corresponding to the spot diameter of the laser light L is acquired for each irradiation of the laser light L by the irradiation unit 13. In the case of the projection type, when the spot size of the laser light L includes the entire of the measurement region R1, imaging mass spectrometry can be performed by one irradiation of the laser light L. In the case of the projection type, when the spot size of the laser light L does not include the entire of the measurement region R1, the signal of the entire of the measurement region R1 can be acquired by performing scanning and irradiation of the laser light L in the same manner as in the scanning type. The ionization method described above can also be used for other measurements and experiments such as ion mobility measurements.

The use of the sample support body is not limited to ionization of the sample by irradiation with the laser light L. The sample support body can be used for ionization of a sample by irradiation with an energy beam such as laser light, an ion beam, or an electron beam. In the ionization method and the mass spectrometry method described above, a sample may be ionized by irradiation of the energy beam.

As illustrated in FIG. 7, in the embodiment described above, the sample support body is placed on the sample S, and the component S1 of the sample S sucked up from the second surface 2b side to the first surface 2a side by the capillary phenomenon is ionized. However, the method of ionizing the sample S using sample support body is not limited to the form described above. For example, the sample S (e.g., liquid sample) to be measured may be dropped from the first surface 2a side to the measurement region R1 of the sample support body.

Further, the frame 3 may be formed of a material having no acid resistance. In this case, in order to prevent corrosion of the frame 3 in the pore-widening treatment described above, a metal film having acid resistance may be coated on the surface of the frame 3 by, for example, plating. However, when the frame 3 is formed of a material having acid resistance, there is an advantage in that the plating process may be omitted before the pore-widening treatment.

In the above-described embodiment, the conductive layer 5 has the fourth portion 5d provided on the second face 3g of the frame 3.

However, when the frame 3 has conductivity (for example, when the frame 3 is formed of a metallic material), the fourth portion 5d may be omitted. On the other hand, when the frame 3 does not have conductivity (for example, when the frame 3 is formed of ceramics or the like), the conductive tape 4 and at least a part of the fourth portion 5d may be configured to be in contact with each other. In this case, a voltage can be applied to the fourth portion 5d of the conductive layer 5 via the conductive tape 4.

Further, the adhesive layer 6 is not necessarily formed of a photo-curable adhesive, and may be formed of a thermosetting adhesive, for example. In this case, heat treatment (for example, at 150° C. for 4 hours) is necessary to cure the adhesive layer 6. However, by forming the frame using a material (for example, 42Alloy or the like) having a thermal expansion coefficient equal to or less than the thermal expansion coefficient of the substrate 2, it is possible to suitably suppress the occurrence of deflection of the substrate 2 with respect to the frame 3.

REFERENCE SIGNS LIST 1A, 1B sample support body,
2 substrate
2a first surface
2b second surface
2c through hole
3 frame
3a opening part
3g second face
3h first face
5 conductive layer
5a first portion
5b second portion
5c third portion
6 adhesive layer
6a protruding portion
7 metal oxide film
B adhesive
D thickness direction
R1 measurement region
S sample

The invention claimed is:

1. A sample support body used for ionizing a sample, comprising:
   an insulating substrate having a first surface, a second surface opposite to the first surface, and a measurement region formed with a plurality of through holes opening to the first surface and the second surface;
   a frame having a first face facing the first surface and a second face opposite to the first face, in which an opening part opening to the first face and the second face is formed to correspond to the measurement region, the frame being formed on the first surface such that the opening part overlaps the measurement region when viewed from a thickness direction of the substrate;
   an adhesive layer formed between the first surface and the first face to bond the substrate and the frame, the adhesive layer having a protruding portion protruding from an inner surface of the opening part toward the measurement region when viewed from the thickness direction; and
   a conductive layer having a first portion provided along the inner surface of the opening part, a second portion provided along the first surface of the measurement region, and a third portion provided along a surface of the protruding portion so as to connect the first portion and the second portion.

2. The sample support body according to claim 1, wherein the protruding portion has a portion formed on the inner surface of the opening part.

3. The sample support body according to claim 1, wherein, in a portion of the substrate that overlaps the adhesive layer when viewed from the thickness direction, a portion of the adhesive layer is in the through holes.

4. The sample support body according to claim 1, wherein the frame is formed of a non-magnetic material.

5. The sample support body according to claim 1,
wherein the adhesive layer is formed of a photo-curable adhesive.

6. The sample support body according to claim 5,
wherein the adhesive layer is formed of an acrylic adhesive or an epoxy-based adhesive.

7. The sample support body according to claim 1,
wherein the substrate is formed by anodizing a silicon or a valve metal, and
the frame is formed of an acid resistant metal.

8. The sample support body according to claim 7,
wherein the frame is formed of a stainless steel.

9. The sample support body according to claim 1,
further comprising a metal oxide film configured to cover a surface of the adhesive layer such that the surface of the adhesive layer is not exposed to the outside.

10. A method of manufacturing a sample support body, comprising:
a first step of preparing an insulating substrate having a first surface, a second surface opposite to the first surface, and a measurement region formed with a plurality of through holes opening to the first surface and the second surface;
a second step of preparing a frame having a first face and a second face opposite to the first face, in which an opening part opening to the first face and the second face is formed to correspond to the measurement region;
a third step of applying an adhesive to an edge portion of the opening part on the first face;
a fourth step of arranging the substrate such that the substrate overlaps the first face to which the adhesive is applied and the opening part in a state in which the first face is located above the second face, and such that the first surface faces the first face, to bond the substrate and the frame via the adhesive and form a protruding portion by a part of the adhesive, the protruding portion protruding from an inner surface of the opening part toward the measurement region when viewed from a thickness direction of the substrate; and
a fifth step of forming a conductive layer by vapor deposition or sputtering of metal, the conductive layer having a first portion provided along the inner surface of the opening part, a second portion provided along the first surface of the measurement region, and a third portion provided along a surface of the protruding portion so as to connect the first portion and the second portion.

11. The method of manufacturing the sample support body according to claim 10,
wherein the fourth step includes forming the protruding portion having a portion formed on the inner surface of the opening part.

12. The method of manufacturing the sample support body according to claim 10, comprising:
a step of forming a metal oxide film between the fourth step and the fifth step to cover a surface of the adhesive such that the surface of the adhesive is not exposed to the outside.

13. The method of manufacturing the sample support body according to claim 12,
wherein the metal oxide film is formed by an atomic layer deposition method.

14. The method of manufacturing the sample support body according to claim 10, further comprising a step of performing a pore-widening treatment for widening the plurality of through holes by immersing the substrate and the frame in an acidic solution between the fourth step and the fifth step, and
wherein the frame is formed of an acid resistant metal.

15. The method of manufacturing the sample support body according to claim 10,
wherein the adhesive is a photo-curable adhesive, and
the fourth step includes bonding the substrate and the frame by irradiating the adhesive with light.

* * * * *